United States Patent [19]

Droulon

[11] Patent Number: 5,273,241

[45] Date of Patent: Dec. 28, 1993

[54] SLIDE FOR A VEHICLE SEAT WITH A FIXED RETURN POSITION SYSTEM

[75] Inventor: Georges Droulon, Flers, France

[73] Assignee: Bertrand Faure Automobile "BFA", Essone, France

[21] Appl. No.: 955,672

[22] Filed: Oct. 2, 1992

[30] Foreign Application Priority Data

Oct. 11, 1991 [FR] France ................. 91 12537

[51] Int. Cl.$^5$ ............................................. F16M 13/00
[52] U.S. Cl. .................................................. 248/429
[58] Field of Search ............... 248/429, 416, 419, 430, 248/424, 425

[56] References Cited

U.S. PATENT DOCUMENTS

| | | | |
|---|---|---|---|
| 4,154,422 | 5/1979 | Muhr ................................... | 248/429 |
| 4,455,009 | 6/1984 | Foster et al. ......................... | 248/429 |
| 4,671,571 | 6/1987 | Gionet ................................. | 248/429 |
| 4,898,356 | 2/1990 | Pipon et al. ......................... | 248/429 |
| 5,100,092 | 3/1992 | Sovis .................................. | 248/429 |

*Primary Examiner*—Scott Smith
*Attorney, Agent, or Firm*—Robert W. Becker & Associates

[57] ABSTRACT

The lower profile member of a seat slide carries a shoe made of an L-shaped member having two vertical brackets. A first bracket support a spindle on which is mounted a first latch having a lower end which normally bears on the shoe and which is returned to such a position by a coil shaped spring rigidly connected to the vertical bracket and to an upper part of the first latch. Two bearing elements carry a shaft having ends to which two sectors are fixed for supporting an abutment and a pin. The pin is adapted to act on a second latch mounted on the upper profile member for disengaging the first latch. The abutment is used for providing a limitation for a rearward stroke of the upper profile member with respect to the lower profile member.

3 Claims, 4 Drawing Sheets

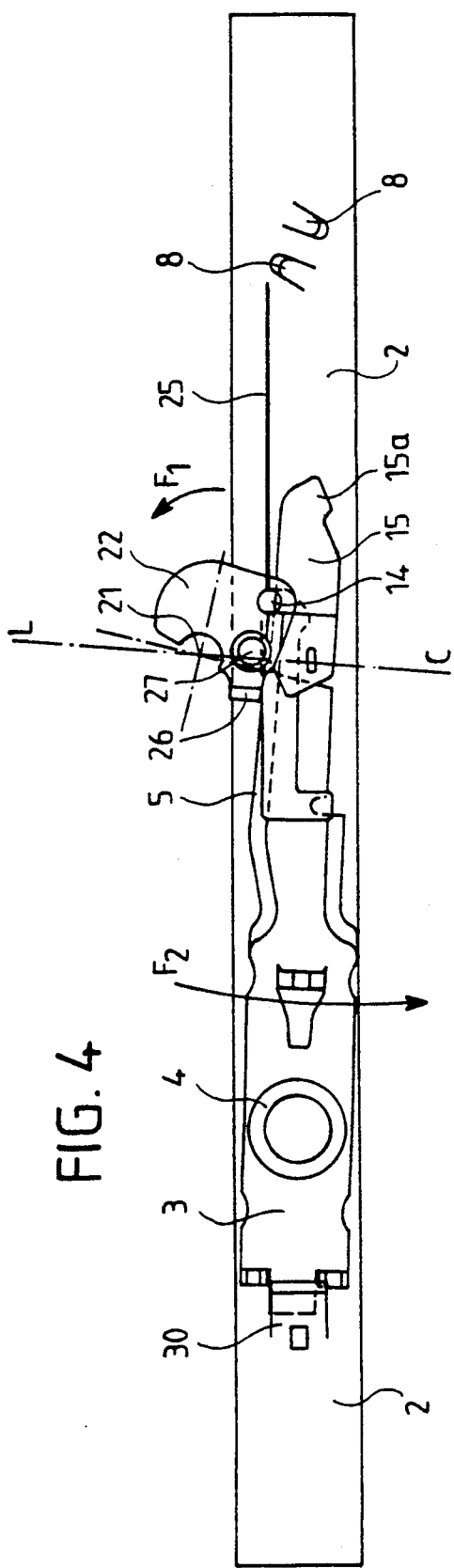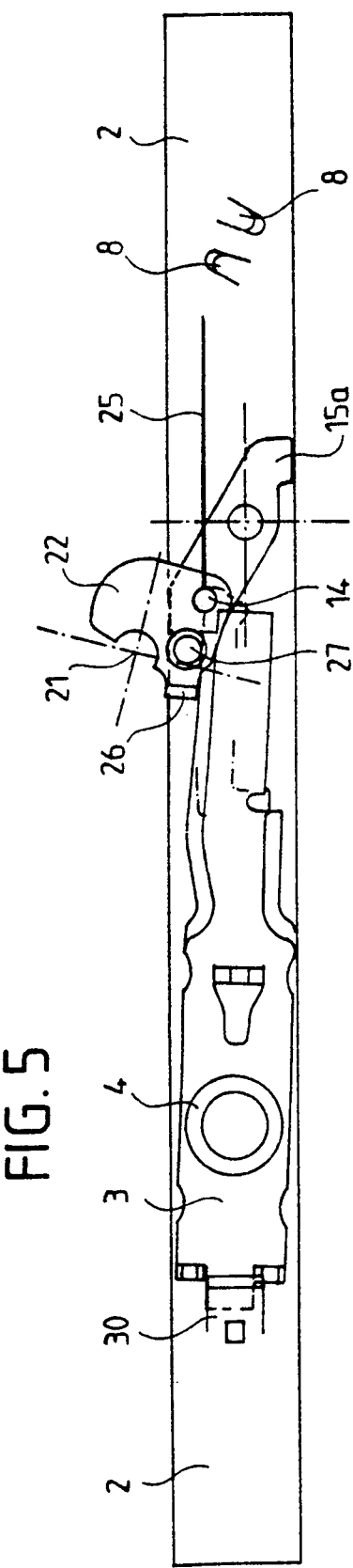
FIG. 4
FIG. 5

SLIDE FOR A VEHICLE SEAT WITH A FIXED RETURN POSITION SYSTEM

FIELD OF THE INVENTION

The invention relates to a slide for a vehicle seat with a fixed return position system.

BACKGROUND OF THE INVENTION

Car manufacturers nowadays propose, in increasing numbers to their customers, so-called two-door vehicles. Such two-door vehicles have in fact a passenger space for four persons, but the rear passengers, in order to come in and out of the vehicle, when the front passengers have left their seat, have to pivot the back portion of each seat over the sitting portion thereof and bring forward the whole assembly in direction of the instrument panel. Then a sufficient space results between the door frame and the front seats to enable the rear passengers of the vehicle to get in or out.

Preset memory slides enabling each front seat of the vehicle to be unlatched and to slide forward after the back portion has been folded over on the sitting portion are already known. These memory slides enable the return of the respective seat to its prior position once the rear passengers of the vehicle have come in or out, but these memory slides are heavy, cumbersome and costly, and also difficult to adjust.

Such known preset memory slides practically cannot be used in low price vehicles since they must be of a simple and inexpensive construction, but yet reliable with a very high resistance against being pulled off. Actually the seats, supported by these slides, are more and more provided with onboard safety belts which, when there is an impact, will apply to the slides a considerable pulling force while absorbing energy, thereby avoiding severe injuries to the passengers sitting on these seats.

SUMMARY OF THE INVENTION

The present invention remedies the above disadvantages by providing slides for vehicle seats with a return position system, which slides are simple, and therefore inexpensive, since very few pieces must be added, and such slides exhibit all the resistance qualities for using them with seats having onboard safety belts.

According to the invention, the slide for a vehicle seat with a fixed return position system has an upper profile member and a lower profile member, the upper profile member being able to slide along the lower profile member, and the lower profile member being rigidly connected to a vehicle floor either directly or indirectly, the upper slide member including in a conventional manner a latch provided with a toothing which cooperate with a rack carried by the fixed lower profile member, the latch being pivotally mounted on a spindle and subjected to action of a leaf spring so that the toothing of the latch is engaged in teeth of the rack, and is characterized in that the lower profile member has a bottom which carries a shoe made of an L-shaped member having a first vertical bracket and a second vertical bracket, the first vertical bracket carrying a spindle on which is mounted a further latch having a lower end which normally bears on the shoe and which is returned to such a position by a coil-shaped spring, which coil-shaped spring is rigidly connected, on one hand, to the vertical bracket and, on an other hand, to an upper part of the further latch, and wherein two bearing elements carry a shaft having ends to which two sectors are fixed, each of the two sectors supporting an abutment and a pin, the pin being adapted to act on each latch for disengaging the toothing of each latch from the rack and then disengaging the further latch against action of the coil-shaped spring, and the abutment to be used as a reference abutment for providing a limitation for a rearward stroke of the upper profile member with respect to the lower profile member, the limitation being obtained when the pin comes into contact with an upper portion of the vertical bracket of the shoe.

Various other features of the invention will become more apparent from the following detailed description.

BRIEF DESCRIPTION OF DRAWINGS

An embodiment of the invention is shown by way of non limiting examples in the accompanying drawings, wherein:

FIGS. 3, 4, 5 and 6 are schematic side elevation views showing the movement of the parts forming the upper profile member of a slide with a fixed return position.

DESCRIPTION OF THE PREFERRED EMBODIMENTS

Figure 1:
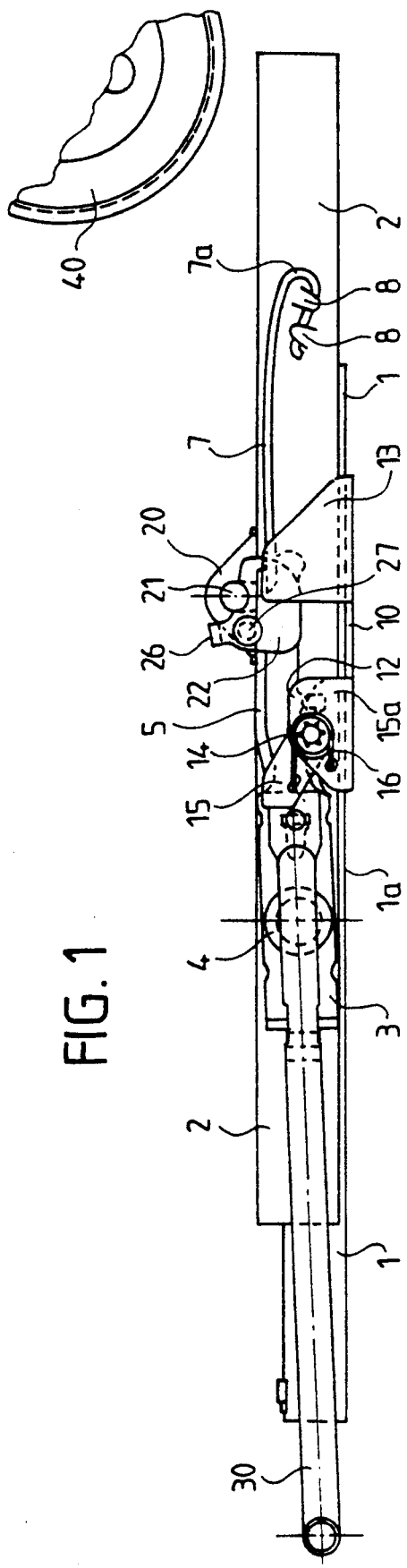
FIG. 1 is a side elevation view of one of the slides used in a front seat including the fixed return arrangement.
Figure 3:
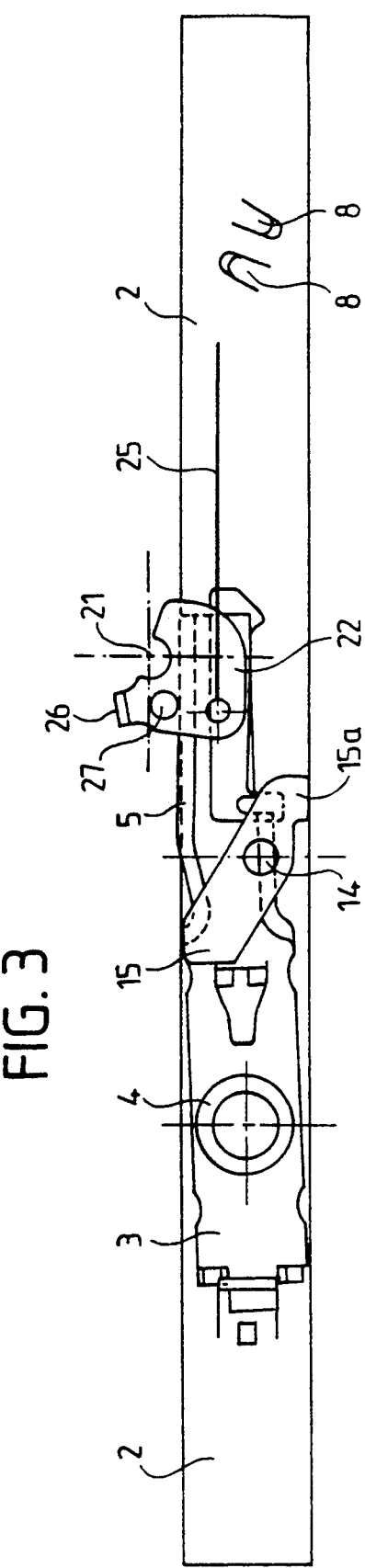

Referring now to the drawings, FIG. 1 shows the lower profile member 1 of a slide of an automobile vehicle seat. This profile member 1 is, in any conventional manner, fixed directly or indirectly to the vehicle floor.

Generally, each of the driver and passenger front seats are provided with two substantially parallel slides, the second portion of which is made of an upper profile member 2 which extends over the lower profile member 1. The two profile members 1 and 2 have each generally a shape of the letter W, with the lower profile member 1 being in the normal position of the W shape and the upper profile member 2 in the reversed position. Balls and braces are conventionally interposed between the two profile members 1 and 2 in order to assist the sliding of each upper profile member 2 with respect to each lower profile member 1.

The lower profile member 1 carries notches on one of its wings (generally the inner wing). These notches, not shown, form a rack for cooperating with a toothing of a latch 3 provided for each slide on the inner side of the slide (see FIG. 2). The toothed latch 3 is articulated on a spindle 4 placed substantially forward of the respective latch 3.

The latch 3 carries also, at its rear portion 3a, a leg 5 which has in its rear portion a window 6 provided for connecting a leaf spring 7. The leaf spring 7 is fastened with by its rear portion 7a by a set of clamps 8 formed by puncturing the inner side wing of each upper profile member 2 to the upper profile member 2.

Such mounting is conventional and thus does not require any further description.

In the present invention, there is placed a shoe 10 underneath the lower face 1a of the lower profile member 1. This shoe 10 is a L-shaped member having two lower plates 11 fixed underneath the lower profile member 1 and two vertical brackets 12, 13 the function of which will be explained hereinafter.

The vertical bracket 12 is pierced with a hole inside which is mounted a spindle 14 which is used as a rotation element for a latch 15 having the shape of a lever. The lower end 15a of the latch 15 normally rests on the bottom of the shoe 10.

The latch 15 is returned to its normal position by a spring 16 having the shape of a coil. One end 16a of the spring 16 is rigidly connected to the latch 15 while the other end 16b is rigidly connected to the vertical bracket 12 of the lower plate 11.

A top portion 2a of the upper profile member 2 carries two bearing elements 20 in which is rotatably mounted a shaft 21 with its ends 21a, 21b. The shaft 21 has connected thereto two sectors 22, 23 of which one at least (generally the outer sector 23 in the present case) is connected by a cable 25 to the back portion 40 of a seat supported by the hereabove described slides. The cable 25 is usually connected to the mobile outer flange of the back portion of the seat which has to be folded over on the sitting portion before pushing the same forward relative to the vehicle when the rear passengers of a two-door vehicle are getting in or out.

During the pivoting movement of the sectors 22, 23 (arrow $F_1$, FIG. 4), a pivoting of the abutments 26 at the ends of the sectors 22, 23, as well as a pivoting of the pins 27 rigidly connected to these sectors 22, 23 about the shaft 21 takes place.

When the abutments 26 bear on the wing 5 of the latches 3, the pins 27 come at the same time into engagement with the upper portion of the latch 15, and the members are in the position shown in FIG. 4.

Thus, the end 15a of each latch 15 does not rest any longer on each shoe 10 and, at the same time, the two latches 3 have been lowered in direction of arrow $F_2$ (FIG. 4). This disengages completely the upper profile member 2 from the lower profile member 1 of each slide.

Actually, the pivoting in direction of the arrow $F_2$ of the latch 3 will disengage the teeth of the latch 3 from the teeth of the rack of the lower profile member 1.

It is then easy to push forward the respective front seat.

When the passengers are out of the vehicle or when the passengers have taken their seat in the rear portion of the vehicle, the front seat(s) of the respective vehicle are pushed back while the back portion of the seat is still folded on the corresponding sitting portion and, therefore, both the latches 3 and latches 15 are in the position shown in FIG. 4, in which each slide profile member 2 is disengaged from the respective lower slide profile member 1.

This is possible since, in the position shown in FIG. 4, the pins 27 have passed beyond the dead point shown by the full line LC in FIG. 4.

Actually, this position is held by the abutments 26 which come to rest strongly against the wings 5 of the latches 3.

The respective seat is pushed rearwardly, and the back portion is then returned to its upright position. The pins 27 do not bear any longer on the latches 15 which return to their position under effect of the coil shaped springs 16.

Likewise, the abutments 26 disengage the rear of the latches 3 and, under the action of the leaf springs 7, the latches 3 will move upwardly in a direction counter to that of the arrow $F_2$ in FIG. 4. Each upper profile member 2 is therefore latched on each lower profile member 1 by intermeshing of the latch 3 rigidly connected to each upper profile member 2 with the rack of each lower profile member 1.

Figure 2:
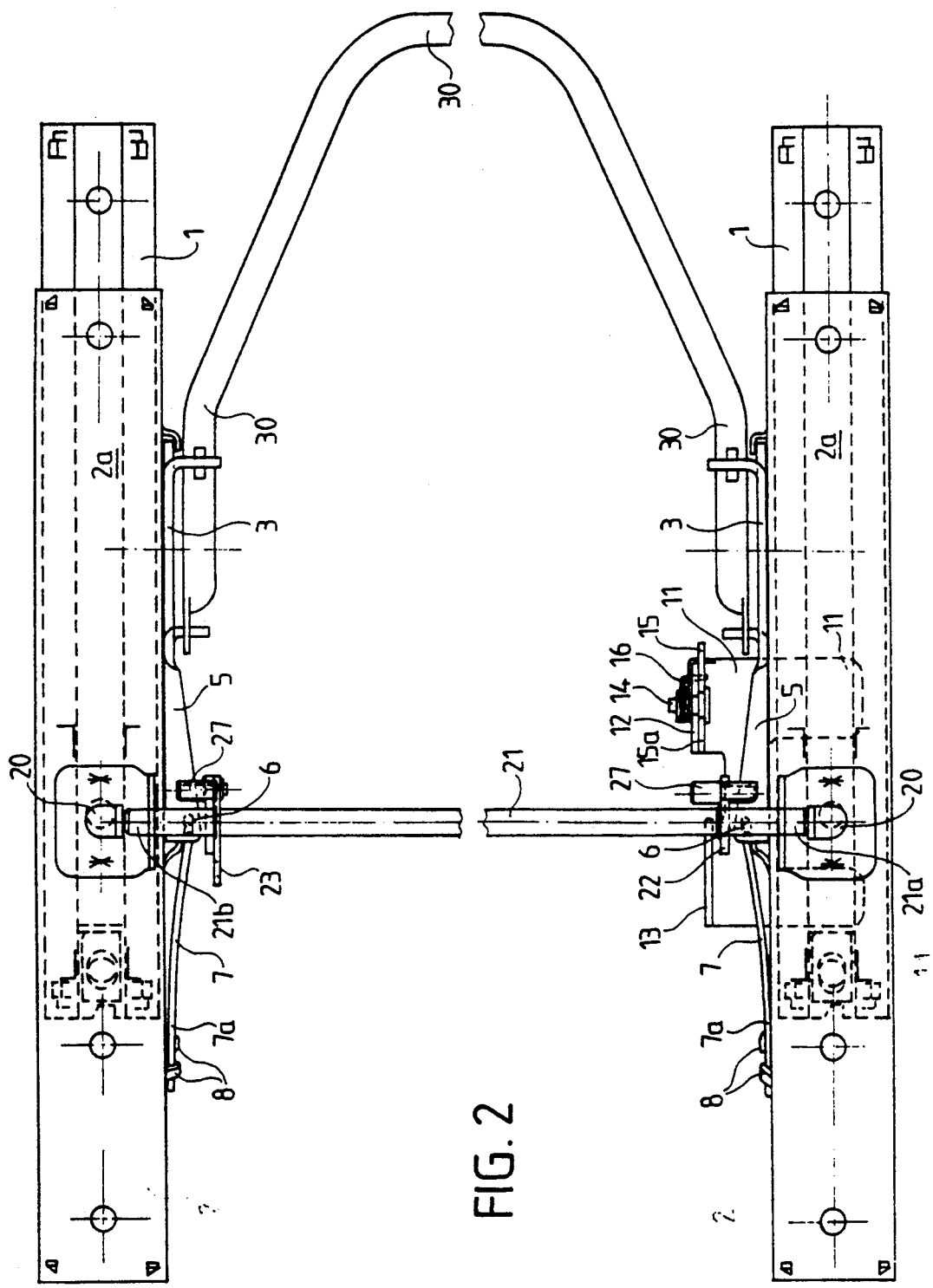
FIG. 2 is a plan view showing the two slides of a seat according to the invention.
Figure 6:
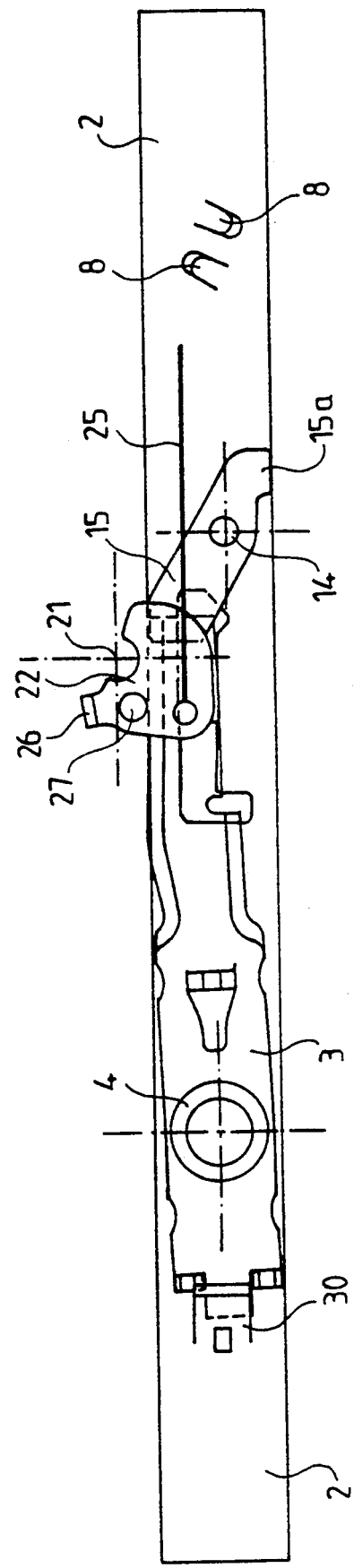

At that moment, the passenger or driver can sit on the respective seat and adjust the seat in the usual manner by using the control bar 30 normally provided on the latches of the slides (see FIG. 2).

When, for some reason, the back portion of the seat is not returned to its upright position when the upper profile members 2 are disengaged from the lower profile members 1, or when the back portion of the seat is wrongly returned to its upright position, the upper profile members 2 can slide rearwardly. The abutments 26 have not yet resumed their normal position in this case, and the pins 27, in the rearward direction, will come into abutment against the front face of the vertical bracket 13 of the shoe 10. The rearward stroke of the seat is thus limited and the upper profile members 2 are prevented from detachment from the lower profile members 1.

The present invention is, of course, in no way restricted to the specific disclosure of the specification and drawings, but also encompasses any modifications within the scope of the appended claims.

What is claimed is:

1. A slide for a vehicle seat, including a back portion and a sitting portion, with a fixed return position system, said slide comprising:

two lower profile members with a bottom portion and two upper profile members each one of said upper profile members slidably connected to one of said lower profile members, said lower profile members fixedly connected to a vehicle floor;

each said lower profile member comprising a rack and each said upper profile member comprising a first spindle and a first latch with a toothing, said first latch pivotably mounted on said first spindle, each said upper profile member further having a leaf spring connected to said first latch for forcing into engagement said first latch with said rack;

each said lower profile member further comprising a L-shaped shoe connected to said bottom portion, said shoe comprising a first and a second vertical bracket, said first vertical bracket having a second spindle;

a second latch connected to said second spindle such that in an initial position a lower end of said latch rests on said shoe;

a coiled spring connected with one end to said first vertical bracket and with the other end to an upper part of said second latch, said coiled spring forcing said lower end of said second latch into said initial position;

each said upper profile member comprising a bearing element connected to a top portion of each said upper profile member;

a shaft with ends connected to said bearing elements, each said end having a sector connected thereto, each said sector having an abutment and a pin, wherein said abutment acts on said first latch for disengaging said toothing from said rack in a disengagement position and said pin disengages said second latch against the force of said coiled spring from said initial position into an end position to allow a sliding movement of said upper profile members relative to said lower profile members; and said pin limiting a rearward movement of said upper profile member relative to said lower profile member when abutting said second vertical bracket of said shoe.

2. A slide according to claim 1, further comprising a cable having one end attached to one of said sectors, said cable having the other end attached to a rotary portion of an articulation mechanism positioned between the sitting portion and the back portion of the vehicle seat, with a rotation of said sector achieved by said cable.

3. A slide according to claim 1, wherein said disengagement position and said end position are stabilized by passing said pin beyond a dead point of said sectors, and wherein said toothing again engages said rack and said initial position is resumed when the back portion of the vehicle seat is returned into a substantially upright position.

* * * * *